United States Patent
Nickel et al.

(10) Patent No.: US 9,290,141 B2
(45) Date of Patent: Mar. 22, 2016

(54) BUMPER SUPPORT FOR A VEHICLE

(71) Applicant: GM GLOBAL TECHNOLOGY OPERATIONS LLC, Detroit, MI (US)

(72) Inventors: Marco Nickel, Riedstadt (DE); Theobald Hock, Grossostheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/541,970

(22) Filed: Nov. 14, 2014

(65) Prior Publication Data

US 2015/0137540 A1  May 21, 2015

(30) Foreign Application Priority Data

Nov. 15, 2013 (DE) .......................... 10 2013 019 124

(51) Int. Cl.
*B60R 19/26* (2006.01)
*B60R 19/36* (2006.01)
*B60R 19/03* (2006.01)

(52) U.S. Cl.
CPC ................. *B60R 19/36* (2013.01); *B60R 19/03* (2013.01); *B60R 19/26* (2013.01)

(58) Field of Classification Search
CPC ........ B60R 19/36; B60R 19/03; B60R 19/26; B60R 19/30; B60R 19/34
USPC ...................... 296/187.04; 293/132, 133, 155
See application file for complete search history.

(56) References Cited

U.S. PATENT DOCUMENTS

| 3,724,833 | A | * | 4/1973 | Sergay | .......................... | 267/140 |
| 3,779,591 | A | * | 12/1973 | Rands | ............................ | 293/133 |
| 4,190,276 | A | * | 2/1980 | Hirano et al. | .................. | 293/133 |
| 4,272,114 | A | * | 6/1981 | Hirano et al. | .................. | 293/133 |
| 4,465,312 | A | * | 8/1984 | Werner | .......................... | 293/132 |
| 6,113,178 | A | * | 9/2000 | Faigle | ...................... | 296/187.06 |
| 6,554,333 | B2 | * | 4/2003 | Shimotsu et al. | ............. | 293/132 |
| 7,416,043 | B2 | * | 8/2008 | Pipkorn et al. | ................ | 180/274 |
| 7,597,383 | B2 | * | 10/2009 | Itou et al. | .................. | 296/187.04 |
| 8,210,583 | B2 | * | 7/2012 | Wavde et al. | .................. | 293/132 |
| 8,469,417 | B2 | * | 6/2013 | Di Modugno | ................ | 293/133 |
| 8,622,463 | B2 |   | 1/2014 | Schaefer | | |

(Continued)

FOREIGN PATENT DOCUMENTS

DE          10137911 A1    1/2003
DE     102005016456 A1   11/2006

(Continued)

OTHER PUBLICATIONS

Great Britain Patent Office, Great Britain Search Report for Great Britain Application No. 1419136.5, dated Mar. 23, 2015.

*Primary Examiner* — Dennis H Pedder
(74) *Attorney, Agent, or Firm* — Ingrassia Fisher & Lorenz PC

(57) ABSTRACT

A bumper support for a motor vehicle with a stiffening structure and at least two connections for connecting the bumper support on the one hand to a bumper and on the other hand to a vehicle body is provided. The bumper support comprises at least one extension structure arranged in the region of at least one of the connections and serving as energy absorber, which is connected to the stiffening structure in a materially joined manner.

20 Claims, 1 Drawing Sheet

(56) References Cited

U.S. PATENT DOCUMENTS

| | | | | |
|---|---|---|---|---|
| 2002/0167183 | A1* | 11/2002 | Shimotsu et al. | 293/132 |
| 2003/0034659 | A1* | 2/2003 | Summe et al. | 293/133 |
| 2007/0176442 | A1* | 8/2007 | Mori et al. | 293/133 |
| 2011/0233947 | A1* | 9/2011 | Baccouche et al. | 293/133 |
| 2012/0146348 | A1* | 6/2012 | Di Modugno | 293/133 |
| 2013/0300139 | A1* | 11/2013 | Fukawatase | 293/133 |
| 2014/0091585 | A1 | 4/2014 | Ramoutar et al. | |
| 2014/0217758 | A1 | 8/2014 | Nickel et al. | |

FOREIGN PATENT DOCUMENTS

| | | |
|---|---|---|
| DE | 102011109180 A1 | 2/2012 |
| DE | 102011121397 A1 | 7/2013 |
| DE | 102012024979 A1 | 6/2014 |
| JP | 2001039242 A | 2/2001 |
| KR | 1020130063415 A | 6/2013 |
| WO | 2014088045 A1 | 6/2014 |
| WO | 2014139680 A1 | 9/2014 |

* cited by examiner

BUMPER SUPPORT FOR A VEHICLE

CROSS REFERENCE TO RELATED APPLICATION

This application claims priority to German Patent Application No. 102013019124.6, filed on Nov. 15, 2013, which is incorporated herein by reference in its entirety.

TECHNICAL FIELD

The technical field relates to a bumper support for a vehicle with a stiffening structure and at least two connections for connecting the bumper support on the one hand to a bumper and on the other hand to a vehicle body, in particular a frame structure.

BACKGROUND

Bumper supports are usually employed for reinforcing the lower region for example of a front bumper. During the course of measures aimed at pedestrian protection, the bumper and also the bumper support are to be designed as components which, in the case of an event, give way and thereby absorb at least a part of the energy of the event. In the region of the bumper, the energy absorption capacity of the components arranged there serves for protecting an object during an event.

In addition, other objects, desirable features and characteristics will become apparent from the subsequent summary and detailed description, and the appended claims, taken in conjunction with the accompanying drawings and this background.

SUMMARY

An embodiment of the present disclosure is based on providing a bumper support with the features mentioned at the outset, which on the one hand are optimized in their stiffening effect with respect to the associated bumper and on the other hand in its absorption capacity for an event.

A bumper support for a vehicle has a stiffening structure and at least two connections for connecting the bumper support on the one hand to a bumper and on the other hand to a vehicle body, in one example, a frame structure.

The bumper support furthermore comprises at least one extension structure arranged in the region of at least one of the connections and serving as energy absorber, which is integrally connected to the stiffening structure in a materially joined manner. Because of this, the bumper support assumes a combined effect, namely on the one hand to have a reinforcing effect with respect to the bumper and on the other hand remove at least a part of the event energy. Because of the fact that the extension structure and the stiffening structure are connected to one another in a materially joined manner, an interfering effect through screws or other fastening means at the transition between the extension structure and the stiffening structure is avoided. In addition, the bumper support can be realized in a simple and cost-effective manner since through the materially joined connection of the extension structure to the stiffening structure additional fastening means as well as additional assembly time for assembling such fastening means can be saved.

Because of the materially joined connection of the extension structure to the stiffening structure, the bumper support is formed by a one-piece component. Such a one-piece component can be formed by joining at least two individual components, wherein the connection of the components can then be detached only by destroying the connection or any connecting means employed.

Appropriately, the stiffening structure is formed as an energy absorber. Through the materially joined connection of the extension structure to the stiffening structure acting as absorber, discontinuities in the load path formed by the two structures, such as for example passage openings for additional connecting means or depressions with weld seams are avoided so that during an event the bumper support can remove energy without interferences.

A particularly good function of the extension structure as energy absorber is provided when according to a configuration the extension structure is deformable, for example, elasto-plastically deformable.

In a technically simple manner, the extension structure acting as energy absorber can be realized in a technically simple manner when it consists of plastic or comprises such a material.

For example, the extension structure can be formed by injection molding, in one example, can be injection-molded onto the stiffening structure. Because of this, the extension structure with its effect as energy absorber can be realized in a simple manner. Because of this, the extension structure can also be connected to the stiffening structure in a technically simple manner, namely in that the extension structure is injection-molded onto the stiffening structure.

Appropriately, the extension structure is substantially formed with a planar design. Because of this, it is favored in its effect as energy absorber. Conceivable, furthermore, is that the extension structure and the stiffening structure are substantially generally planar. Because of this, an effect as energy absorber is favored on the one hand. In addition, this geometry is advantageous for the stiffening structure with respect to the production technology.

In an embodiment, it is provided that the extension structure surrounds the edge of the stiffening structure. Because of this, the bumper support by means of its extension structure then also acts as energy absorber, when for example an off-center event with the motor vehicle occurs. At the same time, the extension structure also acts as a mechanical protection structure with respect to the stiffening structure when the extension structure surrounds the edge of the stiffening structure. This is advantageous when the extension structure is formed from plastic and the stiffening structure for example comprises a sheet metal material or similar. A sharp edge is effectively avoided because of this. It is conceivable that the extension structure partially or completely surrounds the edge of the stiffening structure.

An embodiment can comprise in that the extension structure forms an edge structure which for example forms a positive-locking fit with respect to bumper components. Because of this it is ensured that by way of the extension structure a deformation occurs quickly and even with minor force when during an event forces act on the bumper support. Provided the stiffening structure simultaneously acts also as energy absorber a gently rising force-distance characteristic can be realized over a relatively short distance before, through the stiffening structure acting as energy absorber, high reaction forces with respect to the acting force are briskly removed.

According to an embodiment it is provided that at least one of the connections is formed on the extension structure or by the extension structure. Because of this, production advantages for the stiffening structure are obtained which can be realized in geometries that are simple and can thus be produced in a simple manner.

It is also conceivable that on the extension structure a bracket and/or hold-down is formed. Such a bracket or hold-down can be provided in order to avoid twisting of the bumper support during an event in that the hold-down or bracket comes to lie against a body component and the bumper support thus substantially remains in its installation position. Here, the hold-down acts in the manner of a positively joined movement limiter for the bumper support, which serves as stop for the body part.

Provided that the stiffening structure simultaneously serves also as energy absorber it is appropriate that the stiffening structure is elastically or elasto-plastically deformable. A possible configuration comprises for example that the stiffening structure is formed by an organic sheet. An organic sheet is to mean at least one fiber composite material or fiber matrix semi-finished product which for example consists or comprises a fiber fabric or a fiber lay, wherein the fiber fabric or fiber lay is embedded in a thermoplastic material matrix.

Though the organic sheet, the stiffening structure has the aspired stiffness and strength whereas at the same time the stiffening structure is a compact construction, compact in its height. The organic sheet also has a relatively low material weight and a relatively high specific stiffness, so that the bumper support has a very positive stiffness-density ratio and fuel consumption advantages and emission advantages for the motor vehicle are thereby obtained.

For example, the stiffening structure formed of organic sheet can have a thickness of approximately 0.5 mm to approximately 1.5 mm, in one example, approximately 1.0 mm. Because of this, the stiffening structure is designed in its thickness or height so compact that it can be easily arranged below a vehicle radiator, wherein at the same time the underfloor of the vehicle formed through the stiffening structure runs at a sufficient height in order to be able to run over a curb stone without contact.

By way of the organic sheet the stiffening structure can also be formed as a generally planar structure in a technically simple manner.

Appropriately, the stiffening structure and the extension structure have a deformation characteristic that is distinct compared to one another. Through the extension structure, a gently rising force-distance characteristic can be realized for example. By way of the stiffening structure acting as energy absorber, a deformation behavior can be provided so that high reaction forces can be briskly removed, which act against the forces of the event and thus an energy component of the energy is converted into elastic deformation which energy component is so great that during a test an impactor is accelerated in the opposite direction and a rotation of the impactor is initiated.

According to an embodiment it is provided that the stiffening structure has a substantially continuous depression and the side walls of the depression each face one of the connections. For example, the stiffening structure, in one example, a generally planar structure, can be formed in the manner of a tub. In this manner, the stiffening structure is brought into a geometry which has a particularly stiffening effect in vehicle transverse direction, wherein in the event of an event, elastic or elasto-plastic deformation of the stiffening structure is favored, bending out the stiffening structure running for example below a cooling module.

Furthermore, the present disclosure comprises an arrangement of a bumper support of the type described above between a bumper and the frame structure of a vehicle.

The bumper support, in its functions relative to the bumper, is activated in one example, when according to a configuration the bumper support with one of its connections is connected to the bumper and with the other connection to the frame structure.

In addition to this, the present disclosure comprises a motor vehicle with a bumper support of the type described above. The bumper support can be realized on the motor vehicle in an arrangement of the type described above.

Through the present teachings of the present disclosure, an embodiment of a bumper support is realized which in terms of weight offers a light solution with optimized energy absorption characteristics during an event with the motor vehicle. At the same time, the bumper support satisfies tightest package conditions in the motor vehicle, it can be arranged for example below the radiator of a vehicle, while adequately high ground clearance towards the bottom is provided in order to ride over a curb stone. Through the bumper support a stiff and simultaneously flexible solution for the energy absorption during an event is provided.

The bumper support, in a configuration, has a commencing gently rising force-distance characteristic on which a briskly high reaction force as counterforce to the force of the event then develops in order to convert an energy component into elastic deformation. Through the single-piece construction of the bumper support it is additionally ensured that in the event of an event, deformation of the bumper support without interference takes place which acts without interference. By way of discontinuities, such as for example depressions with weld seams, grooves and screw connections.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The present disclosure will hereinafter be described in conjunction with the following drawing figures, wherein like numerals denote like elements, and.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
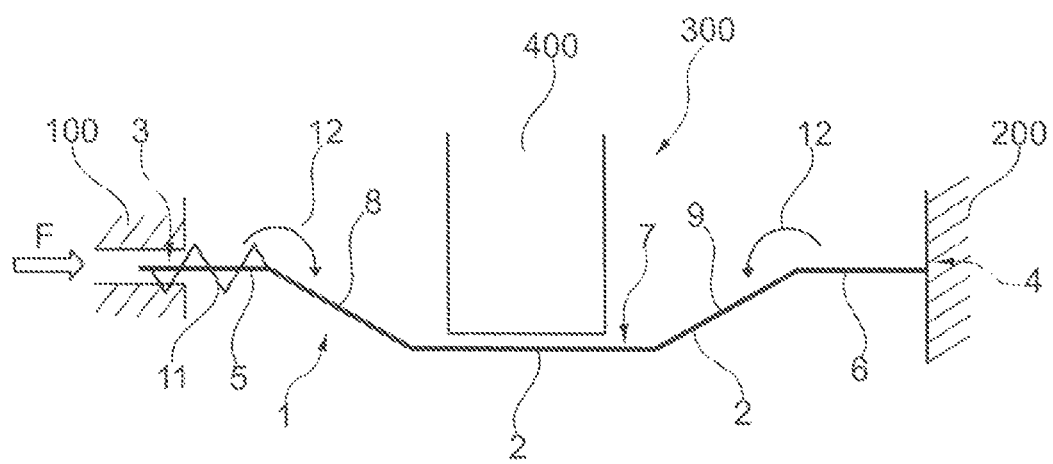
FIG. 1 is an embodiment of a bumper support for a motor vehicle in a schematic representation in installation position as lateral view.

FIG. 1 schematically shows a front vehicle 300 of a motor vehicle in sectional representation along a section in vehicle longitudinal direction. The front vehicle 300 comprises on its end facing towards the front a bumper 100 and a radiator 400, which is arranged between the bumper 100 and the frame structure 200 of the motor vehicle.

The front vehicle 300 furthermore comprises a bumper support 1, which is connected on the one hand to the bumper 100 and on the other hand to the frame structure 200. To this end, the bumper support 1 comprises a connection 3 and a connection 4 in order to be fastened to the bumper 100 and to the frame structure 200 for example in a positive-locking and/or force-fitting manner.

The bumper support 1 can be a so-called lower bumper stiffener. The bumper support 1 comprises a stiffening structure 2 which serves for stiffening the bumper 100 and at the same time acts as an energy absorber during an event with the motor vehicle. The stiffening structure 2 can be formed by an organic sheet which for example has a thickness of approximately 0.5 mm to approximately 1.5 mm, in one example, approximately 1.0 mm. The stiffening structure 2 is designed substantially planar and comprises a depression 7, wherein the side walls 8 and 9 of the depression 7 in each case face one of the connections 3 and 4. The depression 7 substantially runs in vehicle transverse direction.

The bumper support 1 furthermore comprises two extension structures 5 and 6, of which the one extension structure 5 is arranged in the region of the connection 3 and the other extension structure 6 is arranged in the region of the connection 4 and in each case are connected to the stiffening structure 2 in a materially joined manner. The extension structures 5 and 6 lie in the load path formed by the bumper support 1 and during an event serve as energy absorbers in that the extension structures 5 and 6 in the event of a force, remove at least a part of the energy through deformation. To this end, the extension structures 5 and 6 comprise plastic and in one example, are formed by injection molding. For example, the extension structures 5 and 6 are injection-molded onto the stiffening structures 2, so that because of this a connection between the extension structures 5 and 6 and of the stiffening structure 2 is realized without utilizing additional connecting means, and weld seams or the like interferences in the structure of the bumper support 1 is realized.

The deformation of the extension structures 5 and 6 under an acting force F is indicated in FIG. 1 by the course of the line 11, while the deformation does not only relate to the extension structure 5 but the extension structure 6 can also deform during an event.

The extension structures 5 and 6 form the end region of the bumper support 1 each located opposite the other in the region of the connections 3 and 4, wherein the stiffening structure 2 is located in between. In one example, the connections 3 and 4 are formed on the extension structures 5 and 6, for example, created through molding-on by the injection-molding method.

In one example, the extension structures 5 are oriented substantially horizontally in the installation position according to FIG. 1, wherein the side walls 8 and 9 of the stiffening structure 2 following thereon run obliquely downwards in order to form the tub-shaped configuration of the stiffening structure 2 with its depression 7 running in vehicle transverse direction. Because of this, the deformation characteristic of the stiffening structure 2 is favored during an event.

Provided that the force F acts on the bumper 100, the extension structure 5 for example is deformed first according to the line 11 while bending-out of the stiffening structure 2 in the direction according to the arrow 12 occurs following this. This deformation behavior occurs on both sides of the bumper support 1, i.e. also opposite the connection 4 and the extension section 6 provided there and the side wall 9 of the stiffening structure 2.

Figure 2:
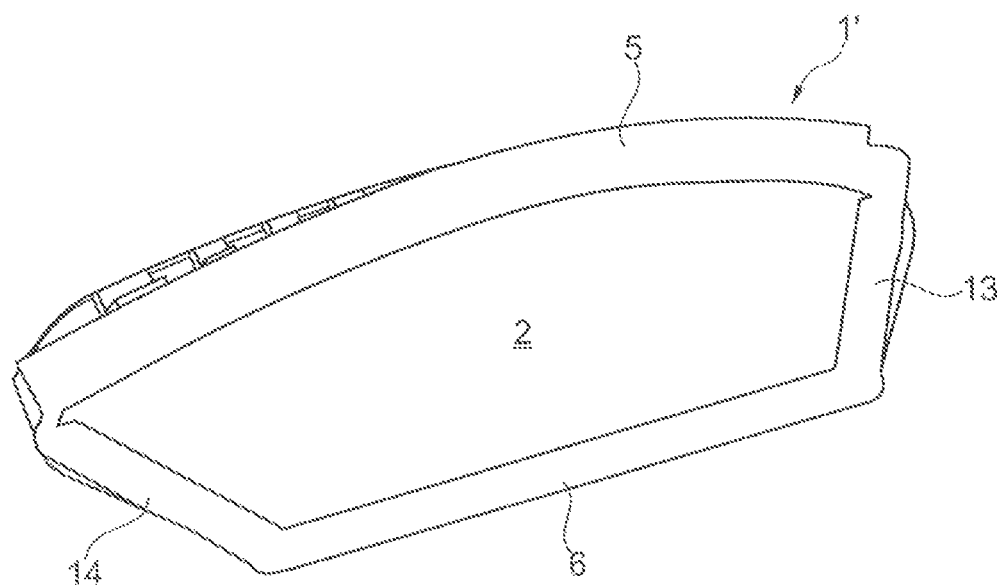
FIG. 2 is an embodiment of a bumper support for a vehicle in top view.

FIG. 2 shows an embodiment of a bumper support 1' for a vehicle, wherein the bumper support 1' there is at least schematically shown in a top view. The bumper support 1' can be formed identically to the bumper support 1 according to FIG. 1.

As is evident from FIG. 2, the stiffening structure 2 is designed substantially planar, wherein the extension structures 5 and 6 are connected to one another by means of the laterally arranged extension structures 13 and 14. Through the extension structures 5, 6 and 13, 14, a ring structure is thus formed which surrounds the stiffening structure 2. The extension structures 5, 6, 13 and 14 form an edge structure, which surrounds the edge of the stiffening structure 2 and is connected in a materially joined manner, for example, by injection molding onto the edge of the stiffening structure 2.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A bumper support for a vehicle, comprising:
   a stiffening structure having at least two sidewalls;
   at least two connections for connecting the bumper support to a bumper and a vehicle body; and
   at least one extension structure arranged in the region of at least one of the at least two connections to serve as energy absorber,
   wherein the at least one extension structure is substantially planar and connected to the stiffening structure in a materially joined manner, and
   wherein the sidewalls of the stiffening structure run obliquely downward to form a tub-shaped configuration.

2. The bumper support according to claim 1, wherein the at least one extension structure is deformable.

3. The bumper support according to claim 1, wherein the at least one extension structure comprises a plastic.

4. The bumper support according to claim 1, wherein the at least one extension structure is formed through injection molding.

5. The bumper support according to claim 1, wherein the at least one extension structure surrounds an edge of the stiffening structure.

6. The bumper support according to claim 1, wherein the at least one extension structure forms an edge structure.

7. The bumper support according to claim 1, wherein at least one of the at least two connections is formed on the at least one extension structure.

8. The bumper support according to claim 1, wherein the stiffening structure is elastically deformable.

9. The bumper support according to claim 1, wherein the stiffening structure is formed by a fiber matrix semi-finished product which has a thickness of approximately 0.5 mm to approximately 1.5 mm.

10. The bumper support according to claim 1, wherein the stiffening structure and the at least one extension structure have different deformation characteristics.

11. The bumper support according to claim 1, wherein the stiffening structure has a substantially continuous depression, which includes side walls, and the side walls of the depression each face one of the at least two connections.

12. The bumper support according to claim 1, wherein the at least one extension structure is elasto-plastically deformable.

13. The bumper support according to claim 1, wherein the at least one extension structure is injection-molded onto the stiffening structure.

14. The bumper support according to claim 9, wherein the fiber matrix semi-finished product is an organic sheet with a thickness of approximately 1.0 mm.

15. A motor vehicle, comprising:
a bumper; and
a bumper support including
a stiffening structure having at least two sidewalls,
a first connection coupled to the bumper and a second connection coupled to a body of the motor vehicle such that the bumper support is arranged between the bumper and the body of the motor vehicle, at least one extension structure arranged in the region of at least one of the first connection and the second connection to serve as energy absorber,
wherein the at least one extension structure is substantially planar and connected to the stiffening structure in a materially joined manner, and
wherein the sidewalls of the stiffening structure run obliquely downward to form a tub-shaped configuration.

16. The motor vehicle according to claim 15, wherein the at least one extension structure is deformable.

17. The motor vehicle according to claim 15, wherein the at least one extension structure surrounds an edge of the stiffening structure.

18. The motor vehicle according to claim 15, wherein the at least one extension structure forms an edge structure.

19. The motor vehicle according to claim 15, wherein the stiffening structure has a substantially continuous depression, which includes side walls, and the side walls of the depression each face one of the first connection and the second connection.

20. The bumper support according to claim 1,
wherein the at least one extension structure forms a ring surrounding the stiffening structure.

* * * * *